United States Patent
Tian et al.

(10) Patent No.: US 11,623,520 B2
(45) Date of Patent: Apr. 11, 2023

(54) INFORMATION PROVIDING DEVICE

(71) Applicant: HONDA MOTOR CO., LTD., Tokyo (JP)

(72) Inventors: Lei Tian, Wako (JP); Yuichi Oneda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 178 days.

(21) Appl. No.: 17/132,352

(22) Filed: Dec. 23, 2020

(65) Prior Publication Data

US 2021/0197668 A1 Jul. 1, 2021

(30) Foreign Application Priority Data

Dec. 27, 2019 (JP) ............................. JP2019-238217

(51) Int. Cl.
| | |
|---|---|
| *B60K 35/00* | (2006.01) |
| *B60W 50/14* | (2020.01) |
| *B60W 40/08* | (2012.01) |
| *G06V 20/59* | (2022.01) |

(52) U.S. Cl.
CPC ............ *B60K 35/00* (2013.01); *B60W 40/08* (2013.01); *B60W 50/14* (2013.01); *G06V 20/597* (2022.01); *B60K 2370/152* (2019.05); *B60K 2370/736* (2019.05); *B60W 2050/143* (2013.01); *B60W 2050/146* (2013.01); *B60W 2540/225* (2020.02)

(58) Field of Classification Search
None
See application file for complete search history.

(56) References Cited

U.S. PATENT DOCUMENTS

| | | | |
|---|---|---|---|
| 10,220,778 B2 * | 3/2019 | Tomioka | ................ B60Q 9/008 |
| 2007/0222947 A1 | 9/2007 | Kimata et al. | |
| 2018/0222490 A1 * | 8/2018 | Ishihara | ................ B60K 35/00 |

FOREIGN PATENT DOCUMENTS

| | | |
|---|---|---|
| JP | 2003-214865 A | 7/2003 |
| JP | 2007-259931 A | 10/2007 |
| JP | 2019-012046 A | 1/2019 |

OTHER PUBLICATIONS

Espacenet English Translation of JP2019012046A Description (Year: 2017).*
Office Action dated Dec. 6, 2022 issued over the corresponding Japanese Patent Application No. 2019-238217 with the English translation thereof.

* cited by examiner

*Primary Examiner* — James J Lee
*Assistant Examiner* — Andrew Sang Kim
(74) *Attorney, Agent, or Firm* — Carrier Shende & Associates, P.C.; Joseph P. Carrier; Jeffrey T. Gedeon

(57) ABSTRACT

An information providing device is equipped with one or more displays that display notification information, a camera that acquires information of a vehicle occupant, a vehicle occupant detection unit that detects a field of view of the vehicle occupant, a display determination unit that determines whether or not there is a display that lies within the field of view, a display decision unit that makes a decision, on the basis of the determination of the display determination unit, regarding a notification display to allow the notification information to be displayed, and a notification control unit that controls the one or more displays.

4 Claims, 8 Drawing Sheets

INFORMATION PROVIDING DEVICE

CROSS-REFERENCE TO RELATED APPLICATION

This application is based upon and claims the benefit of priority from Japanese Patent Application No. 2019-238217 filed on Dec. 27, 2019, the contents of which are incorporated herein by reference.

BACKGROUND OF THE INVENTION

Field of the Invention

The present invention relates to an information providing device configured to provide a notification of information to a vehicle occupant.

Description of the Related Art

Vehicles in recent years provide various types of information (referred to as notification information) with respect to vehicle occupants. The types of such notification information and the amount of information tend to increase as the functions of vehicles become more diversified. As types of such notification information, there are included, for example, vehicle failure information, traffic information, incoming email or telephone information, various warning information, weather information, sightseeing information, and the like.

In Japanese Laid-Open Patent Publication No. 2003-214865, a navigation device is disclosed in which incoming email information and email sender information are superimposed and displayed on a screen that displays map information and the position of the driver's own vehicle.

SUMMARY OF THE INVENTION

In many cases, the navigation device is arranged between a driver's seat and a passenger seat. The driver is looking straight ahead while driving, and does not look at the display of the navigation device. Also, passengers who are looking toward the front do not look at the display of the navigation device. Therefore, even if the notification information is unexpectedly displayed on the display of the navigation device, the vehicle occupants do not become aware of such notification information. In this case, the vehicle occupants are incapable of confirming the notification information. Furthermore, in the case that a plurality of displays are mounted inside the vehicle, it is considered to cause a hindrance to driving if the notification information is displayed on all of the displays. As a countermeasure in this case, it may be considered to display the notification information on only one of the displays. However, in such a case, it is thought that the vehicle occupant may overlook the notification information.

The present invention has been devised taking into consideration the aforementioned problems, and has the object of providing an information providing device which is capable of allowing a vehicle occupant to easily become aware of the existence of notification information and to confirm the notification information.

An aspect of the present invention is characterized by an information providing device configured to provide notification information to a vehicle occupant, comprising one or more displays configured to display the notification information, a camera configured to acquire information of a vehicle occupant, a vehicle occupant detection unit configured to detect, on a basis of the image information, a field of view of the vehicle occupant, a display determination unit configured to determine whether or not there is a display that lies within the field of view of the vehicle occupant, based on the field of view of the vehicle occupant detected by the vehicle occupant detection unit, and position information of the one or more displays, a display decision unit configured to make a decision, on a basis of a determination result of the display determination unit, regarding a notification display to allow the notification information to be displayed, and a notification control unit configured to control the one or more displays.

According to the present invention, the vehicle occupant easily becomes aware of the existence of the notification information. As a result, the vehicle occupant is capable of confirming the notification information.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE PREFERRED EMBODIMENTS

A preferred embodiment of an information providing device according to the present invention will be presented and described in detail below with reference to the accompanying drawings.

[1. Configuration of Information Providing Device 10]

Figure 1:
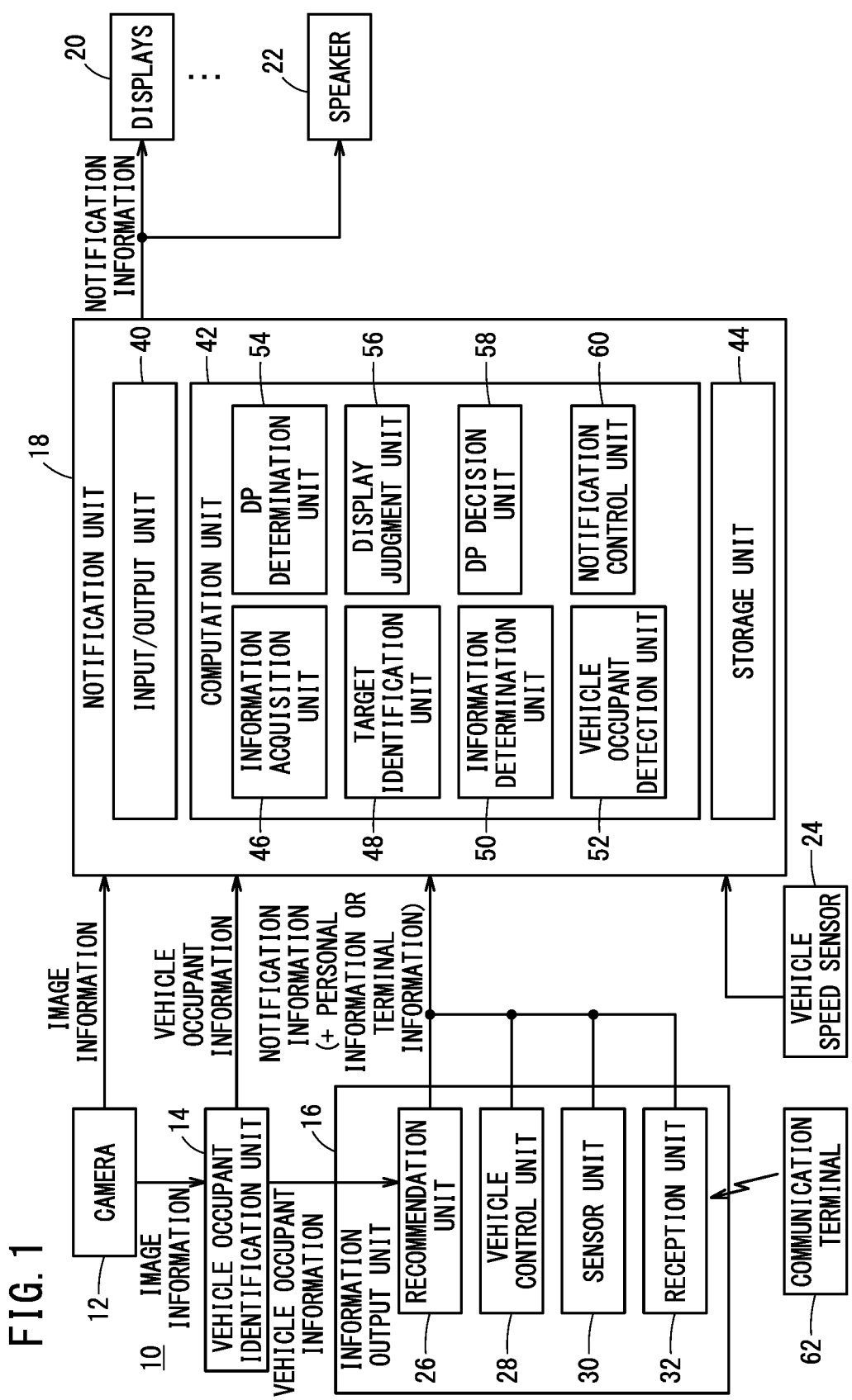
FIG. 1 is a block diagram showing the configuration of an information providing device.

The information providing device 10 shown in FIG. 1 is disposed in a vehicle. The information providing device 10 comprises a camera 12, a vehicle occupant identification unit 14, an information output unit 16, a notification unit 18, displays 20, speakers 22, and a vehicle speed sensor 24.

One or a plurality of cameras 12 are disposed inside a compartment interior of the vehicle. The camera 12 may be an infrared camera. In the case that one individual camera 12 is provided, the camera 12 is arranged at a position where the faces of all of the vehicle occupants H (see FIG. 3, etc.) inside the compartment interior can be photographed, for example, in the vicinity of the rearview mirror. In the case that a plurality of cameras 12 are provided, the cameras 12 are provided for each seat. The camera 12 photographs the faces of the vehicle occupants H and outputs acquired image information to the vehicle occupant identification unit 14 and the notification unit 18.

The vehicle occupant identification unit 14 is equipped with a computation device comprising a processor, a storage device, a communication interface, and the like. The processor executes a general face recognition algorithm, and identifies the vehicle occupants H. The storage device stores the image information of the faces of the vehicle occupants H and the personal information (personal identification information) of the vehicle occupants H in a database in association with each other. The vehicle occupant identification unit 14 identifies the vehicle occupants H based on the image information acquired by the camera 12 and the information of the database. The vehicle occupant identification unit 14 outputs vehicle occupant information in which the personal information and information of the seat positions of the vehicle occupants H are associated with each other to the information output unit 16 and the notification unit 18.

The information output unit 16 includes a function to output the notification information in relation to the vehicle occupants H to the notification unit 18. In the present embodiment, the information output unit 16 includes a recommendation unit 26, a vehicle control unit 28, a sensor unit 30, and a reception unit 32.

The recommendation unit 26 is equipped with a computation device comprising a processor, a storage device, a communication interface, and the like. For example, the recommendation unit 26 is configured in the form of a navigation device (not shown). The processor executes a predetermined algorithm, and selects information that conforms with the preferences of the vehicle occupant H. The storage device stores the personal information of the vehicle occupant H, and information indicating the preferences of the vehicle occupant H in a database in association with each other. For example, the recommendation unit 26 selects POI (points of interest) that conform with the preferences of the vehicle occupant H from among POI candidates such as stores and facilities or the like existing in the vicinity of the vehicle. In addition, the recommendation unit 26 outputs to the notification unit 18 the personal information of the vehicle occupant H, who is regarded as a target of notification, and the notification information of the POI.

The vehicle control unit 28 includes various ECUs that control respective components of the vehicle, such as an FI-ECU, a brake ECU, an EPS-ECU, and the like. The respective ECUs detect failures of the respective components. The vehicle control unit 28 outputs notification information indicating that one or more failures have occurred to the notification unit 18.

The sensor unit 30 includes various types of sensors that are provided in the vehicle. Examples of such sensors include a sensor that detects a remaining amount of fuel, a sensor that detects the clasped state of a seat belt, and the like. The sensor unit 30 outputs the detected notification information to the notification unit 18.

The reception unit 32 is equipped with a receiver, for example, a Bluetooth (registered trademark) receiver, for short-range wireless communications. The reception unit 32 receives information from a communication terminal 62 (a smartphone or the like) carried by the vehicle occupant H. For example, in the case of an incoming telephone call or email, the communication terminal 62 transmits information indicating the reception of the incoming telephone call or email to the reception unit 32. At this time, the reception unit 32 outputs to the notification unit 18 terminal information (terminal identification information) for the communication terminal 62, and notification information indicating that the communication terminal 62 has received the incoming telephone call or email.

The notification unit 18 is, e.g., made up from an ECU, and includes an input/output unit 40, a computation unit 42, and a storage unit 44. The input/output unit 40 is constituted by an A/D conversion circuit, a communication interface, and the like. The computation unit 42 is constituted from a processor equipped with, for example, a CPU or the like. The computation unit 42 realizes various functions by executing programs stored in the storage unit 44. In the present embodiment, the computation unit 42 functions as an information acquisition unit 46, a target identification unit 48, an information determination unit 50, a vehicle occupant detection unit 52, a display determination unit 54 (also referred to as a DP determination unit 54), a display judgment unit 56, a display decision unit 58 (also referred to as a DP decision unit 58), and a notification control unit 60.

The information acquisition unit 46 acquires the notification information from the information output unit 16. In the case that there are a plurality of vehicle occupants H in the compartment interior of the vehicle, the target identification unit 48 identifies a target person to whom the notification information is to be notified. The information determination unit 50 determines the type of notification information, for example, whether it is information related to driving, information related to preferences, or information related to an incoming telephone call or email, or the like. The vehicle occupant detection unit 52 detects the state of the vehicle occupant H who is identified as the target person by the target identification unit 48. For example, the vehicle occupant detection unit 52 detects a field of view 82 (see FIG. 3, etc.) of the vehicle occupant H based on the image information. Further, the vehicle occupant detection unit 52 detects whether or not the vehicle occupant H is currently driving.

The DP determination unit 54 determines whether or not there is a display 20 that lies within the field of view 82 of the vehicle occupant H, based on the field of view 82 of the vehicle occupant H detected by the vehicle occupant detection unit 52, and the position information of the displays 20. The display judgment unit 56 judges whether or not the notification information can be displayed on each of the displays 20. Based on the determination result of the DP determination unit 54, the DP decision unit 58 makes a decision concerning a notification display 20a (also referred to as a notification DP 20a) which is allowed to display the notification information. The notification control unit 60 processes the notification information so as to be made capable of being displayed on the notification DP 20a, and outputs the notification information after processing thereof to the notification DP 20a. Further, the notification control unit 60 processes the notification information in a manner so that the speakers 22 can output the notification information, and outputs the notification information after processing thereof to the speakers 22.

The storage unit 44 is constituted by a RAM and a ROM or the like. The storage unit 44 stores, in addition to various programs, various information used by processes of the computation unit 42. In this instance, the storage unit 44 stores a predetermined angular range used when setting the field of view 82 of the vehicle occupant H. Further, the storage unit 44 stores position information indicating the positions of each of the displays 20. Further, the storage unit 44 stores personal information of the vehicle occupant H and the identification information of the communication terminal 62 in association with each other.

Figure 2:
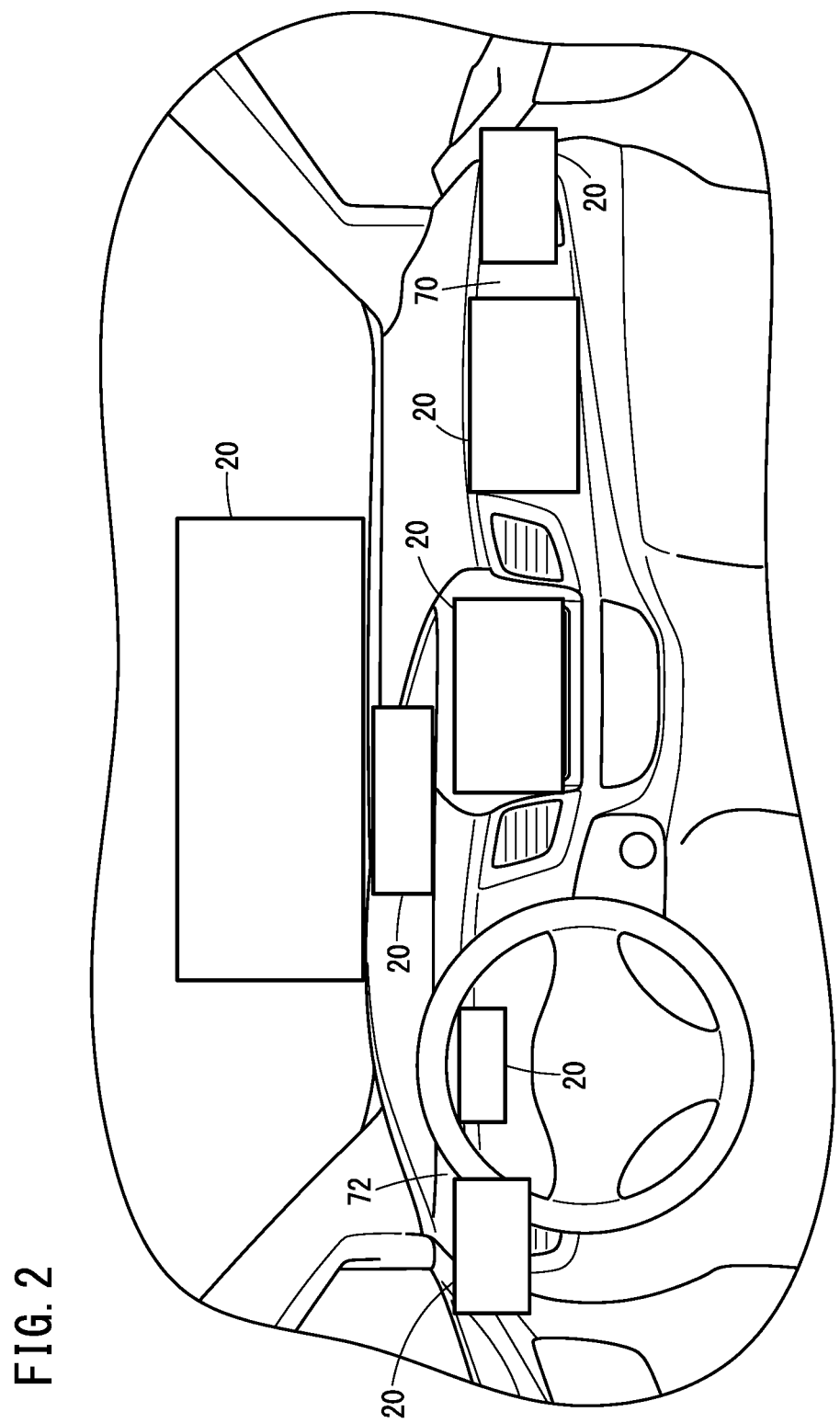
FIG. 2 is a diagram showing the positions of displays provided in a vehicle.

A plurality of the displays 20 are disposed inside the compartment interior of the vehicle. As shown in FIG. 2, the displays 20 may be provided on an instrument panel 70 (dashboard), may be provided on a meter panel 72, and may be provided in the form of a head-up display. Further, the displays 20 may be provided at other positions apart from those illustrated. The displays 20 display the notification information that is output from the notification unit 18.

The speakers 22 are provided in the compartment interior of the vehicle. The speakers 22 output voice information that is output from the notification unit 18.

[2. Outline of Functions of Information Providing Device 10]

Figure 3:
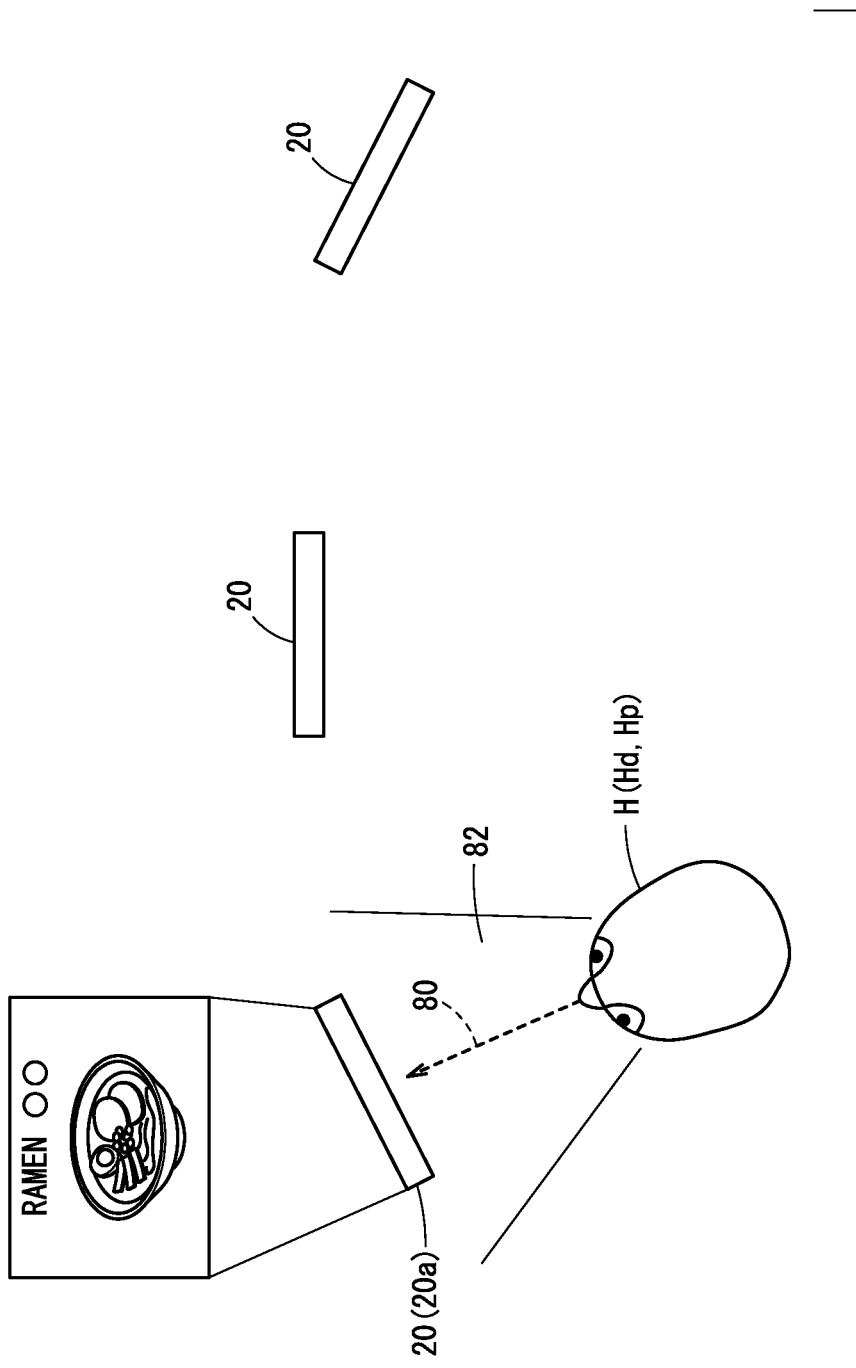
FIG. 3 is a diagram showing an embodiment in which a display that lies within the field of view of a vehicle occupant is used as a notification display.
Figure 4:
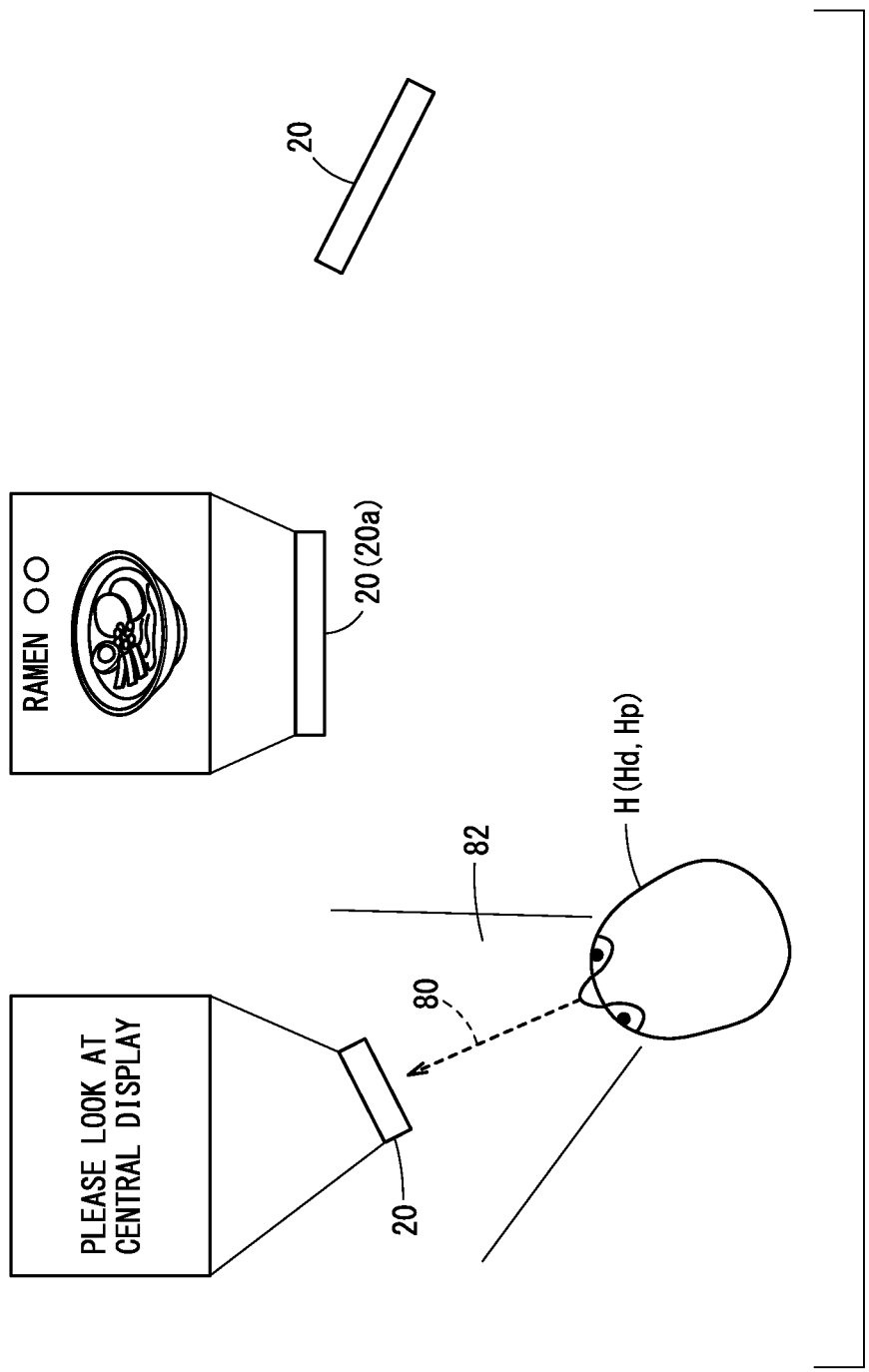
FIG. 4 is a diagram showing an embodiment in which a display that lies within the field of view of a vehicle occupant is not used as a notification display.
Figure 5:
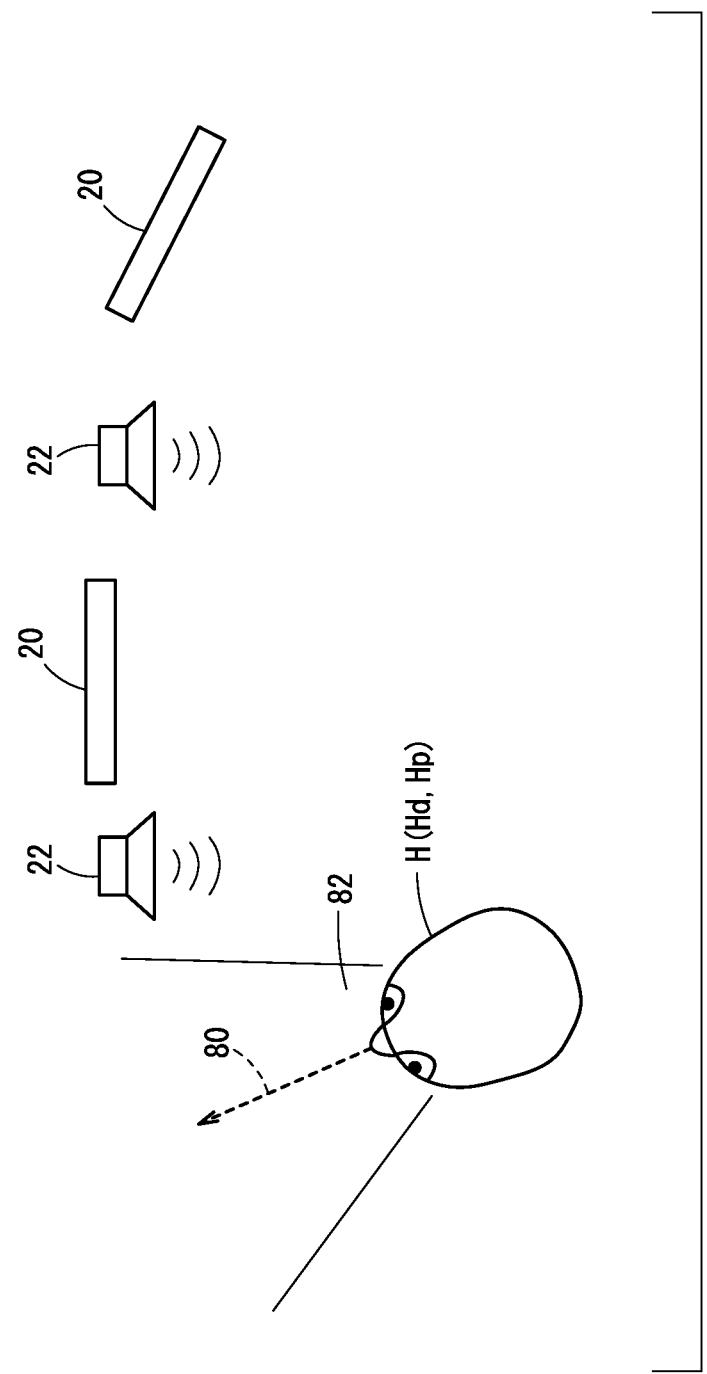
FIG. 5 is a diagram showing an embodiment in which there is no display that lies within the field of view of the vehicle occupant.

In the case that the notification unit 18 has acquired the notification information from the information output unit 16, the information providing device 10 executes a notifying operation as shown in FIGS. 3 to 5. In FIGS. 3 to 5, a state is schematically illustrated in which the positional relationship between the vehicle occupant H and the plurality of displays 20 is viewed from above the compartment interior.

As shown in FIG. 3, in the case that a display 20 lies within the field of view 82 of the vehicle occupant H who is a target person to be notified, the DP decision unit 58 uses such a display 20 as the notification DP 20*a*. At this time, the notification control unit 60 causes the notification DP 20*a* to display the notification information.

On the other hand, cases may occur in which the display 20 lying within the field of view 82 of the vehicle occupant H is not suitable for displaying the notification information. For example, cases may occur in which the screen of the display 20 is too small in relation to the amount of information provided in the notification information, or cases may occur in which an image included in the notification information cannot be displayed on the display 20.

As shown in FIG. 4, in the case that a display 20 lies within the field of view 82 of the vehicle occupant H, and moreover, the notification information is incapable of being displayed on such a display 20, the DP decision unit 58 uses another display 20 that does not lie within the field of view 82 as the notification DP 20*a*. At this time, the notification control unit 60 causes the display 20 lying within the field of view 82 to display a message for guiding a line of sight 80 of the vehicle occupant H to the notification DP 20*a*. In addition, the notification control unit 60 causes the notification information to be displayed on the notification DP 20*a* which is the guidance destination for the line of sight 80.

As shown in FIG. 5, when the displays 20 do not lie within the field of view 82 of the vehicle occupant H who is the target person to be notified, the notification control unit 60 causes the speakers 22 to output the notification information.

[3. Information Providing Process]

An information providing process performed by the information providing device 10 will be described with reference to FIGS. 6 to 8. The process described below is initiated, for example, at a timing at which a vehicle power switch (not shown) is turned on, or at a timing at which a start switch (not shown) for the information providing process is operated.

In step S1, on the basis of the image information, the vehicle occupant identification unit 14 determines the presence or absence of a vehicle occupant H for each of the seats, and identifies the vehicle occupants H who are seated in the seats. Then, the vehicle occupant identification unit 14 outputs the vehicle occupant information to the information output unit 16 and the notification unit 18. Upon completion of step S1, the process transitions to step S2.

In step S2, the information acquisition unit 46 determines the presence or absence of the notification information output from the information output unit 16. In the case that the notification information is present (step S2: YES), the process transitions to step S3. On the other hand, in the case that the notification information is not present (step S2: NO), the process of step S2 is repeatedly executed.

In step S3, the target identification unit 48 identifies the target person to be notified, together with identifying the seating position of the target person. For example, in the case that the information determination unit 50 determines the notification information output from the recommendation unit 26, the target identification unit 48 identifies the target person to be notified and the seating position thereof, based on the personal information acquired together with the notification information, and the vehicle occupant information acquired in step S1. For example, in the case that the information determination unit 50 determines the notification information output from the vehicle control unit 28 or the sensor unit 30, the target identification unit 48 identifies the driver Hd as the target person to be notified, together with identifying the driver's seat as the seating position. For example, in the case that the information determination unit 50 determines the notification information output from the reception unit 32, the target identification unit 48 identifies the target person to be notified and the seating position thereof, based on the terminal information acquired together with the notification information, and the vehicle occupant information acquired in step S1.

In step S4, based on the identification result of step S3, the target identification unit 48 determines whether or not the target person to be notified is the driver Hd. In the case that the target person to be notified is the driver Hd (step S4: YES), the process transitions to step S5. On the other hand, in the case that the target person to be notified is not the driver Hd, or stated otherwise, in the case that the target person to be notified is a passenger Hp (see FIG. 3, etc.) (step S4: NO), the process transitions to step S6.

In step S5, a driver process (see FIG. 7) for determining the form of the notification made with respect to the driver Hd is performed. Upon completion of the driver process, the process transitions to step S7.

In step S6, a passenger process (see FIG. 8) for determining the form of the notification with respect to the passenger Hp is performed. Upon completion of the passenger process, the process transitions to step S7.

In step S7, the notification control unit 60 determines the presence or absence of the notification DP 20*a*. If the notification DP 20*a* was decided upon in step S5 or step S6, the notification control unit 60 determines that there is a notification DP 20*a*. In this case (step S7: YES), the process proceeds to step S8. On the other hand, if the notification DP 20*a* was not decided upon in step S5 or step S6, the notification control unit 60 determines that a notification DP 20*a* does not exist. In this case (step S7: NO), the process transitions to step S9.

In step S8, the notification control unit 60 processes the notification information so as to be made capable of being displayed by the notification DP 20*a* that was decided upon in step S5 or step S6. Then, the notification control unit 60 causes the notification information to be displayed on the notification DP 20*a* (see FIGS. 3 and 4). Furthermore, the notification control unit 60 causes the notification information that was displayed on the notification DP 20*a* to not be displayed (i.e., to be hidden) at a predetermined timing, for example, a timing at which the vehicle occupant H makes a response (performs a switching operation or the like) with respect to the notification information, or a timing after a predetermined time period has elapsed. Upon completion of step S8, the process transitions to step S10.

In step S9, the notification control unit 60 processes the notification information into a format that can be output by way of voice. Then, the notification control unit 60 causes the speakers 22 to output the notification information by way of voice (see FIG. 5). Upon completion of step S9, the process transitions to step S10.

In step S10, for example, in the case that a stop switch (not shown) for the information providing process is operated (step S10: YES), the information providing process is brought to an end. On the other hand, in the case that the stop switch is not operated (step S10: NO), the process returns to step S2, and the information providing process is continued.

[3.1. Driver Process]

Figure 6:
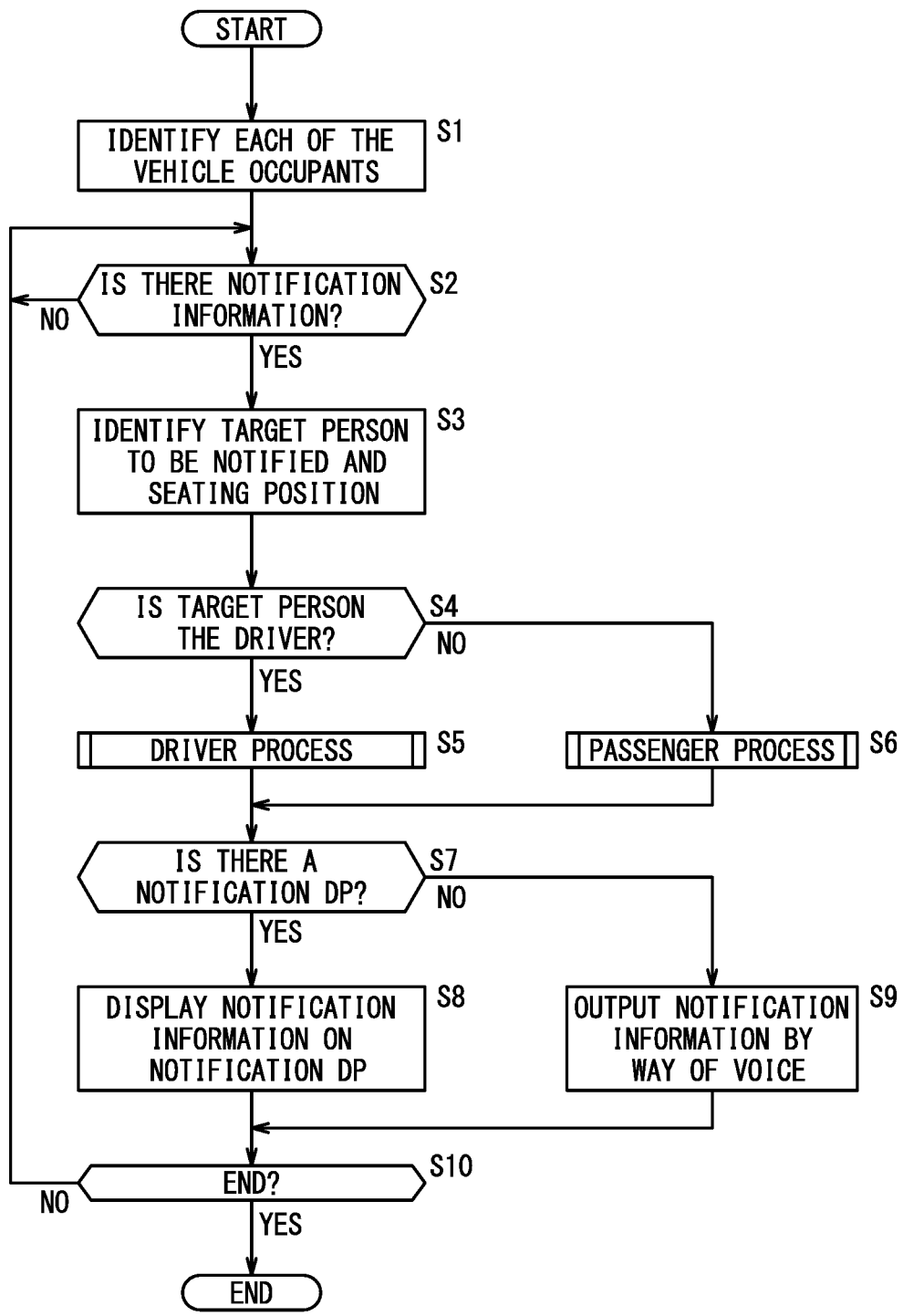
FIG. 6 is a diagram showing the process flow of an information providing process.
Figure 7:
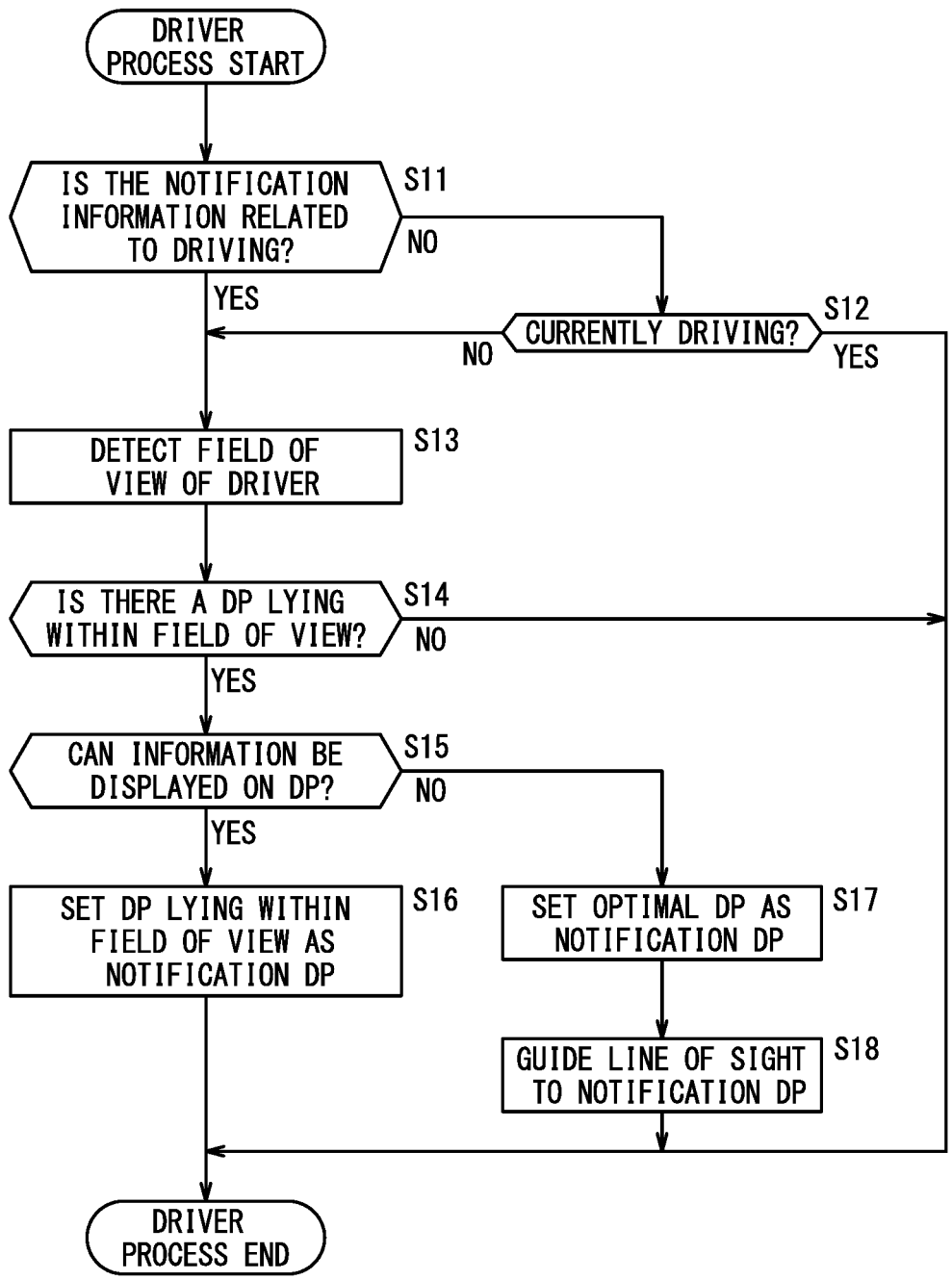
FIG. 7 is a diagram showing the process flow of a driver process.

FIG. 7 shows the process flow of a driver process performed in step S5 of the information providing process shown in FIG. 6. The driver process is a process for making a decision regarding the form of the notification made with respect to the driver Hd, in the case that the target person to be notified is the driver Hd.

In step S11, the information determination unit 50 determines whether or not the notification information is related to driving. The information determination unit 50 determines that the notification information which is output from the vehicle control unit 28 or the sensor unit 30 is information related to driving. Further, even if the notification information is output from the recommendation unit 26, as long as it is information related to driving, the information determination unit 50 determines that such information is information related to driving. In the case that the notification information is related to driving (step S11: YES), the process transitions to step S13. On the other hand, in the case that the notification information is not related to driving (step S11: NO), the process transitions to step S12.

In step S12, the vehicle occupant detection unit 52 determines whether or not the driver Hd is currently driving. For example, the vehicle occupant detection unit 52 determines the vehicle speed on the basis of the vehicle speed information output by the vehicle speed sensor 24. In the case that the vehicle speed is not zero, the vehicle occupant detection unit 52 determines that the vehicle is currently traveling, and that the driver Hd is currently driving. In this case (step S12: YES), the driver process is brought to an end. In this manner, in the case that the driver Hd is currently driving, the notification DP 20a is not set. On the other hand, in the case that the vehicle speed is zero, the vehicle occupant detection unit 52 determines that the vehicle is currently stopped, and the driver Hd is not currently driving. In this case (step S12: NO), the process transitions to step S13.

In step S13, the vehicle occupant detection unit 52 detects, on the basis of the image information, the field of view 82 of the driver Hd. For example, the vehicle occupant detection unit 52 detects the line of sight 80 of the driver Hd by a line of sight detection technique (see, for example, Japanese Laid-Open Patent Publication No. 2007-259931). Alternatively, the vehicle occupant detection unit 52 may detect a direction of the face of the driver Hd, and set the detected direction as the line of sight 80. Furthermore, the vehicle occupant detection unit 52 sets a predetermined angular range about the detected line of sight 80 and which is stored in the storage unit 44 (an angular range above and below and to the left and right centered about the line of sight 80 and taking the driver Hd as a reference point), and establishes such a range as the field of view 82. Upon completion of step S13, the process transitions to step S14.

In step S14, the DP determination unit 54 determines whether or not there is a display 20 that lies within the field of view 82 of the driver Hd. The DP determination unit 54 compares the positions of each of the displays 20 with positions included within the field of view 82. In addition, the DP determination unit 54 determines whether or not any one of the displays 20 lies within the field of view 82. In the case that any one of the displays 20 lies within the field of view 82 (step S14: YES), the process transitions to step S15. On the other hand, in the case that the displays 20 do not lie within the field of view 82 (step S14: NO), the driver process is brought to an end. In this manner, in the event there are no displays 20 that lie within the field of view 82, the notification DP 20a is not set.

In step S15, the display judgment unit 56 makes a judgment as to whether or not the notification information is capable of being displayed on the display 20 that lies within the field of view 82. For example, the display judgment unit 56 compares the specifications of the display 20 (screen size, processing performance, etc.) with the type of notification information. In the case that the display 20 lying within the field of view 82 is capable of notifying (capable of displaying) the notification information (step S15: YES), the process transitions to step S16. On the other hand, in the case that the display 20 lying within the field of view 82 is not capable of notifying (capable of displaying) the notification information (step S15: NO), the process transitions to step S17.

In step S16, the DP decision unit 58 sets the display 20 that lies within the field of view 82 of the driver Hd as the notification DP 20a. Upon completion of step S16, the driver process is brought to an end.

In step S17, the DP decision unit 58 sets an optimum one of the displays 20 as the notification DP 20a. In this instance, the DP decision unit 58 searches, from among the plurality of displays 20, for displays 20 that are capable of displaying the notification information, and with respect to such notification information, makes a decision to set the optimum one of the displays 20 as the notification DP 20a. Upon completion of step S17, the process transitions to step S18.

In step S18, the notification control unit 60 causes the display 20 that lies within the field of view 82 of the driver Hd to display guidance information for guiding the line of sight 80 of the driver Hd to the notification DP 20a. For example, as shown in FIG. 4, the notification control unit 60 may cause a message in the form of guidance information to be displayed, or may cause a symbol such as an arrow or the like indicating a direction to be displayed on the display 20 that lies within the field of view 82 of the driver Hd. Furthermore, the notification control unit 60 may output the guidance information via the speakers 22. Upon completion of step S18, the driver process is brought to an end.

[3.2. Passenger Process]

Figure 8:
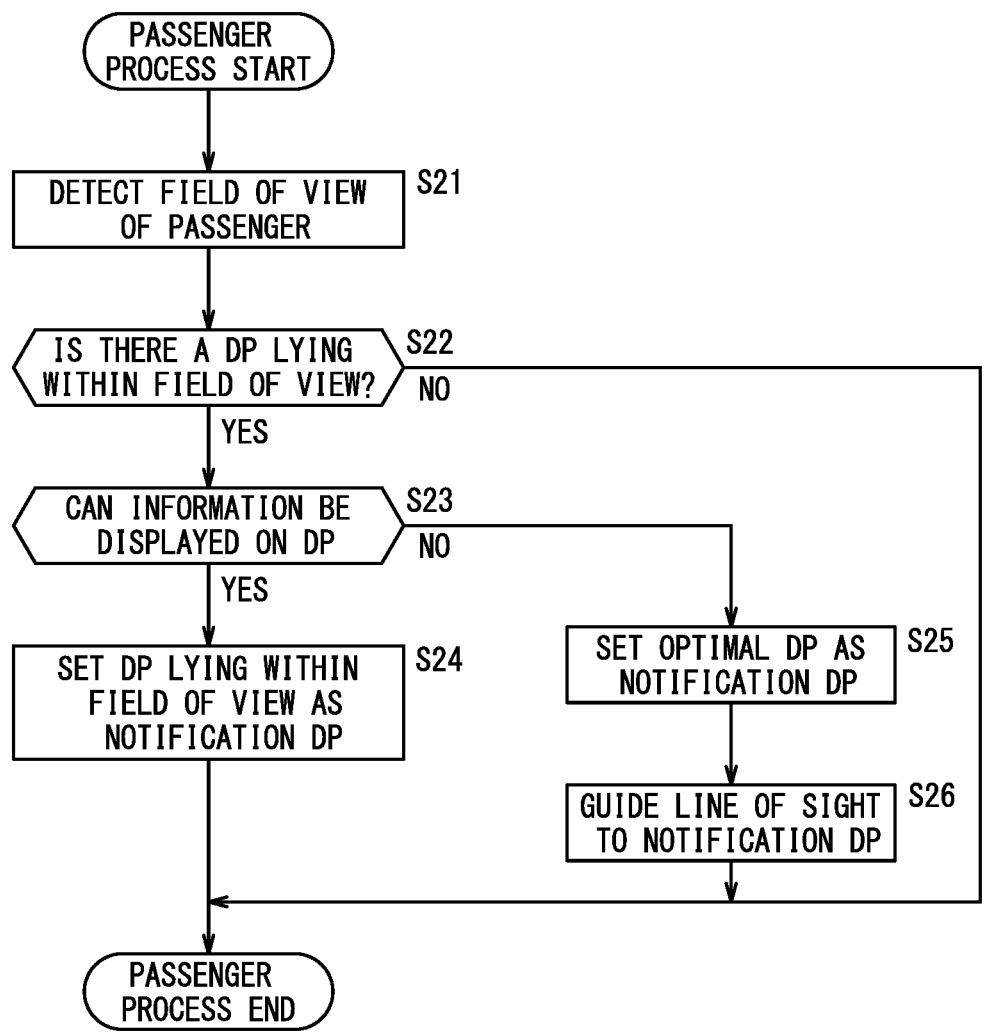
FIG. 8 is a diagram showing the process flow of a passenger process.

FIG. 8 shows the process flow of a passenger process performed in step S6 of the information providing process shown in FIG. 6. The passenger process is a process of making a decision regarding the form of the notification made with respect to the passenger Hp, in the case that the target person to be notified is the passenger Hp.

The process of steps S21 to S26 of the passenger process shown in FIG. 8 is substantially the same as the process of steps S13 to S18 of the driver process shown in FIG. 7. A description concerning steps S21 to S26 can be obtained by replacing the "driver Hd" with the "passenger Hp" within the above description made in relation to steps S13 to S18.

[4. Modifications]

Instead of determining whether or not there is a display 20 that lies within the field of view 82 of the vehicle occupant H, the display determination unit 54 may determine whether or not there is a display 20 ahead of the line of sight 80 of the vehicle occupant H.

A display 20 which is capable of displaying individual information in a plurality of areas of a screen, for example, is a display 20 that is elongated to the left and right. In the case that such a display 20 is provided in the vehicle, the notification control unit 60 may guide the line of sight 80 of the vehicle occupant H from one area to another area of the screen.

The information output unit 16 may output notification information apart from the information indicated in the above-described embodiment. For example, the information output unit 16 may include a device that outputs answers to questions asked by the vehicle occupant H.

In the case of a NO determination in step S14 of FIG. 7, the notification control unit 60 may output the guidance information by the speakers 22, in a similar manner to the process of step S18. The same feature also applies to the case of a NO determination in step S22 of FIG. 8.

[5. Technical Concepts Obtained from the Embodiments]

Technical concepts that can be grasped from the above-described embodiments will be described below.

The embodiment according to the present invention is characterized by the information providing device 10 configured to provide notification information to the vehicle occupant H, including the one or more displays 20 configured to display the notification information, the camera 12 configured to acquire information of the vehicle occupant H, the vehicle occupant detection unit 52 configured to detect, on the basis of the image information, the field of view 82 of the vehicle occupant H, the display determination unit 54 configured to determine whether or not there is a display 20 that lies within the field of view 82 of the vehicle occupant H, based on the field of view 82 of the vehicle occupant H detected by the vehicle occupant detection unit 52, and the position information of the one or more displays 20, the display decision unit 58 configured to make a decision, on the basis of the determination result of the display determination unit 54, regarding a notification display 20a to allow the notification information to be displayed, and the notification control unit 60 configured to control the one or more displays 20.

In the above-described configuration, the notification display 20a for allowing the notification information to be displayed is determined based on a result of whether or not there is a display 20 that lies within the field of view 82 of the vehicle occupant H. In the case that a display 20 which is being viewed by the vehicle occupant H is the notification display 20a, the notification information lies within the field of view 82 of the vehicle occupant H. Therefore, according to the above-described configuration, the vehicle occupant H can easily be made aware of the existence of the notification information. As a result, the vehicle occupant H is capable of confirming the notification information.

In the embodiment of the present invention, the display decision unit 58 may use the display 20 that lies within the field of view 82 of the vehicle occupant H as the notification display 20a.

In the embodiment of the present invention, there may further be provided the display judgment unit 56 configured to judge whether or not the notification information can be displayed on each of the displays 20, wherein, in the case that the display judgment unit 56 judges that the notification information cannot be displayed on the display 20 that lies within the field of view 82 of the vehicle occupant H, the display decision unit 58 may use as the notification display 20a another of the displays 20 which is judged by the display judgment unit 56 to be capable of displaying the notification information, and the notification control unit 60 may cause the notification information to be displayed on the notification display 20a, together with causing information in order to guide the line of sight 80 of the vehicle occupant H to the notification display 20a, to be displayed on the display 20 that lies within the field of view 82 of the vehicle occupant H.

In accordance with the above-described configuration, since the information for guiding the line of sight 80 of the vehicle occupant H to the notification display 20a is displayed on the display 20 that is being viewed by the vehicle occupant H, the vehicle occupant H can easily be made aware of the existence of the notification information. Furthermore, in accordance with the above-described configuration, since the line of sight 80 of the vehicle occupant H is guided to the notification display 20a, the vehicle occupant H can see the notification information that is displayed on the displays 20. Further, in accordance with the above-described configuration, it is sufficient to provide a plurality of small sub-displays and one large main display in the interior of the vehicle, and it is not necessary for a plurality of large displays to be provided.

In the embodiment of the present invention, there may further be provided the target identification unit 48 configured to identify a target person to whom the notification information is notified from among a plurality of the vehicle occupants H, wherein the vehicle occupant detection unit 52 may detect the field of view 82 of the vehicle occupant H who is identified by the target identification unit 48.

In accordance with the above-described configuration, it is possible to provide the corresponding notification information to such a vehicle occupant H from among each of the vehicle occupants H.

In the embodiment of the present invention, there may further be provided the speaker 22 configured to output the notification information by way of voice, wherein the display decision unit 58 does not make a decision regarding the notification display 20a, in the case that the displays 20 do not lie within the field of view 82 of the vehicle occupant H, and the notification control unit 60 may cause the speaker 22 to output the notification information by way of voice.

In accordance with the above-described configuration, even if the vehicle occupant H is not looking at the displays 20, a minimal amount of the notification information can be transmitted to the vehicle occupant H.

In the embodiment of the present invention, the vehicle occupant detection unit 52 may detect the line of sight 80 of the vehicle occupant H, and the display determination unit 54 may determine, on the basis of the line of sight 80 of the vehicle occupant H detected by the vehicle occupant detection unit 52, and the position information of the one or more displays 20, whether or not there is a display 20 ahead of the line of sight 80 of the vehicle occupant H, and the display 20 ahead of the line of sight 80 of the vehicle occupant H is used as the notification display 20a.

In accordance with the above-described configuration, the vehicle occupant H can easily be made aware of the existence of the notification information.

The information providing system according to the present invention is not limited to the embodiments described above, and it is a matter of course that various modified or additional configurations could be adopted therein without deviating from the essence and gist of the present invention.

What is claimed is:

1. An information providing device configured to provide notification information to a vehicle occupant, comprising:
   one or more displays configured to display the notification information;
   a camera configured to acquire information of a vehicle occupant; and
   one or more processors that execute computer-executable instructions stored in a memory,
   wherein the one or more processors execute the computer-executable instructions to cause the information processing device to:
   detect, on a basis of the image information, a field of view of the vehicle occupant;
   determine whether or not there is a display that lies within the field of view of the vehicle occupant, based on the field of view of the vehicle occupant detected, and position information of the one or more displays;
   make a decision, on a basis of a determination result of whether there is the display, regarding a notification display to allow the notification information to be displayed;
   judge whether or not the notification information can be displayed on each of the displays;
   in a case that it is judged that the notification information cannot be displayed on the display that lies within the field of view of the vehicle occupant,
   use, as the notification display, another of the displays which is judged to be capable of displaying the notification information,
   cause the notification information to be displayed on the notification display, together with causing information in order to guide a line of sight of the vehicle occupant to the notification display, to be displayed on the display that lies within the field of view of the vehicle occupant; and
   control the one or more displays.

2. The information providing device according to claim 1, wherein the one or more processors execute the computer executable instructions to cause the information providing device to identify a target person to whom the notification information is notified from among a plurality of the vehicle occupants,
   wherein the field of view of the target person identified is detected.

3. The information providing device according to claim 1, further comprising a speaker configured to output the notification information by way of voice,
   wherein the one or more processors execute the computer-executable instructions to cause the information providing device to make a decision regarding the notification display, in a case that the displays do not lie within the field of view of the vehicle occupant, and
   cause the speaker to output the notification information by way of voice.

4. The information providing device according to claim 1, wherein the one or more processors execute the computer-executable instructions to cause the information providing device to detect a line of sight of the vehicle occupant, and
   on a basis of the line of sight of the vehicle occupant detected, and the position information of the one or more displays, determine whether or not there is a display ahead of the line of sight of the vehicle occupant, and use the display ahead of the line of sight of the vehicle occupant as the notification display.

* * * * *